Jan. 23, 1968     C. LEDOUX     3,364,522

PLASTIC EXTRUSION MACHINE

Filed May 11, 1966

INVENTOR.

CLAUDE LEDOUX

BY

McDougall, Hersh, Scott & Ladd

ATTYS.

United States Patent Office 3,364,522
Patented Jan. 23, 1968

3,364,522
PLASTIC EXTRUSION MACHINE
Claude Ledoux, Antony, France, assignor to Produits Chimiques Pechiney-Saint-Gobain, Neuilly-sur-Seine, France
Filed May 11, 1966, Ser. No. 549,321
Claims priority, application France, May 19, 1965, 17,626
11 Claims. (Cl. 18—12)

ABSTRACT OF THE DISCLOSURE

An apparatus for the extrusion of plastic materials characterized by low heat stability whereby the plastic material is rapidly reduced to a flowable state, homogenized and extruded before thermal decomposition occurs comprising a housing having a stationary stator in the form of a disc plate, a rotor in the form of a disc plate mounted for rotational movement in face to face relation with the stator and having a central die opening through which the plastic material is extruded with a central cavity in the face of the stator and a plurality of narrow curvilinear blades extending from the faces of the stator and rotor immediately adjacent the die opening for engaging the plastic material substantially instantaneously to heat, homogenize and displace the plastic material to the extrusion die opening.

---

Figure 2:
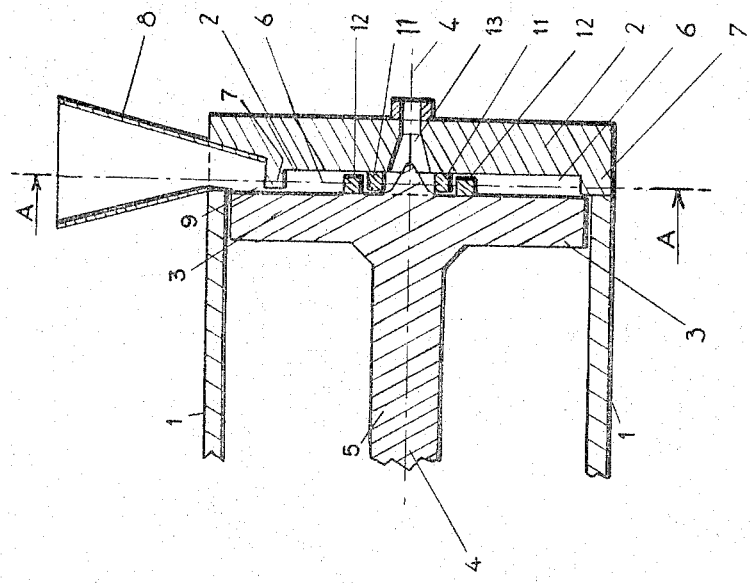

This invention relates to an apparatus for the extrusion of high polymeric materials and more particularly to an extrusion apparatus which makes use of a rotor and stator and which is adapted particularly for the extrusion of plastics subject to decomposition at elevated temperature, as represented by polyvinyl chloride.

In such apparatus, the plastic material is introduced into a free space, generally referred to as an air gap, located between two disc plates mounted in parallel relationship one with another. One of the disc plates, hereinafter called the stator, forms a part of the frame and is therefore stationary. The other disc plate, hereinafter called the rotor, is mounted for turning movement about its axis by a suitable drive means. The rotation of the rotor places the material fed into the apparatus under shearing stress and causes gelation due to the heat developed by the friction and the shearing forces. The viscous plastic mass is homogenized and responsive to the centripetal force created by the shearing action, the mass is extruded through a die located in the central portion of the stator so that the plastic material acquires a shape corresponding to the profile of the die.

Several modifications of such disc type extrusion machines with rotating disc plates have been described for use with plastic materials which are thermally stable and which have favorable rheological characteristics, such as polyethylene or polystyrene. None of these modifications permit polyvinyl chloride to be smoothly extruded, when plasticized or unplasticized. Although a rotor type extruder has some advantages, it also has a number of disadvantages, particularly with respect to the inability to feed regularly and the inability to develop sufficient extrusion pressures. In feeding, the particles of the plastic material fall gravitationally from a hopper into the air gap between the stator and rotor. Oftentimes only a portion of the material fed into the apparatus becomes gelled, sheared and extruded. A part of the gelled mass within the air gap becomes agglomerated in the form of a sticky substance which tends to clog the inlet to the apparatus and gradually completely chokes off the feed.

Furthermore, on occasion, the starting of the disc type extruder becomes difficult. The solid particles rapidly fill the air gap in the central zone where the shearing action is not intense and air heating occurs very slowly so that the material does not become sufficiently plastic for extrusion. This results in the clogging of the die and in the slowing of the movement of the material from the air gap. Thus the material remaining in the air gap becomes heated to excessive temperatures thereby to subject the material to thermal decomposition.

In the attempt to improve the feed, efforts have been made to widen the air gap, as by providing a beveled edge on the periphery of the stator or of the rotor. By themselves, these modifications are not sufficient to render such apparatus suitable for the efficient extrusion of polyvinyl chloride, plasticized or unplasticized.

It is an object of this invention to provide a disc type extruder which is free of the difficulties heretofore described; which can be fed continuously in a regular manner; which permits any desired rate of output under a constant extrusion pressure which is sufficiently high to enable extrusion of plastic materials which are otherwise difficult to handle, and which can be used for the extrusion of polyvinyl chloride.

The disc type apparatus, embodying the features of this invention, comprises essentially a stator and a rotor in which the stator is formed with a cylindrical cavity that is located eccentrically with respect to the central axis of the rotor and in which the periphery more or less limits the zone of gelling and of shearing of the materials to be extruded and in which the periphery is in direct communication with the feed hopper. The rotor is formed with a central portion that extends into the die. The rotor and the stator each have at least one system of a plurality of small deflection blades of arcuate shape or in the shape of spirals and in which the blades are located within the cylindrical cavity, adjacent to and coaxial with the central axis.

When the mass of the material to be extruded enters the cavity or hollow, the mass is driven by the turning blades of the rotor but is retarded by the stationary blades of the stator. The efficiency imparted by the turning blades increases in proportion with the turning speed of the rotor with respect to the material to be sheared whereas the stationary blades on the stator operate further to increase the efficiency by reason of their braking action on the material.

In accordance with an essential characteristic of the invention, the zone of shearing and of gelling of the material to be extruded is restricted to the hollow cavity provided in the stator portion facing the rotor. The edge of the cavity is beveled so that it presents an opening leading into the bottom of the feed hopper which makes it possible for the material to be fed more freely from the hopper into the hollow of the stator. One of the two edges, to the left and to the right of said feed opening, is closer to the center of the hollow than the other edge and forms a type of deflector which forces the material to change its direction of movement towards the center of the cavity thereby to induce the material to move underneath and beyond said opening to insure a continuous smooth feeding operation.

In accordance with another essential characteristic of the invention, the blades on the rotor turn together and act upon the material within the hollow of the stator. The rotor blades are bent towards the extrusion die thereby to orient the material within the zone of the resulting centripetal force of shear to increase the effect of the rotor to displace the gelled (plastic state) material towards the die extending through the center of the stator.

In accordance with a still further characteristic of the invention, the stator blades, which are stationary, are curved spirally in the opposite direction to the curvature of the rotor blades. This brings about an increase in the radial component of the speed of flow of the material but decreases the tangential component.

The invention will now be described with reference to the accompanying drawing which is given by way of illustration, but not by way of limitation, in which—

Figure 1:
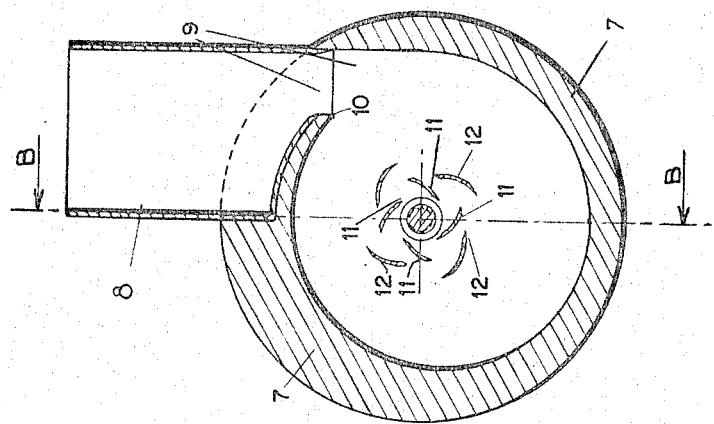

FIG. 1 is a sectional elevational view taken along the line B—B of FIG. 2 or along the longitudinal axis of the extrusion machine embodying the features of this invention, and FIG. 2 is a sectional view taken along the line A—A of FIG. 1.

In the drawing, the numeral 1 represents the frame of the apparatus in which the stator 2 and the rotor 3 are mounted in face to face relationship. The stator 2 is fixed to the frame while the rotor 3 is mounted for rotational movement about its axis, as by suitable driving means (not shown) operatively connected to the axle 4 forming a part of the support shaft 5. The air gap between the stator and the rotor is defined in the face of the stator 2 but in which the cavity does not extend throughout the face of the stator and is therefore limited at its periphery by the edge or flange 7 which has the shape of an internally eccentric ring that is integral with the stator. The beveled portion of the ring leads into a feed opening 9 at the bottom side of a feed hopper 8 through which the material flows from the hopper into the air gap. The feed material is required to change its direction of flow towards the inside of the cavity by the deflecting edge 10 of said feed opening. Within the cavity or the air gap of the stator, a plurality of blades 11 are fixed to the inner face of the stator with the blades being formed to curvilinear shape and arranged in a circular path about the center of the stator. The blades 11 are dimensioned to have a length corresponding to the depth of the cavity so as to extend crosswise thereof. A plurality of other blades 12 are fixed to the rotor with the blade 12 positioned radially outwardly of the stator blades 11 to define a circular path outwardly of the path defined by the stator blades. The stator is formed with a central passage extending axially therethrough, which passage is hereinafter referred to as the die opening 13. The stator blades 11, which extend axially into the air gap, are angled inwardly while the rotor blades 12, which also extend into the air gap for rotational movement about the circular path outwardly of the path of the blades 11, are angled in the opposite direction. The die opening 13 is formed at its entrant portion to a conical shape and the rotor is formed at its center, in axial alignment with the die, with a projection of conical shape which is dimensioned to have a length greater than the width of the air gap so that it extends a short distance into the entrant opening of the die but in which the conical member is of smaller dimension than the entrant opening in the die to provide a substantially uniform annular space therebetween through which the plastic material is displaced for extrusion from the die. The blades 12 fixed to the rotor are dimensioned to have a length corresponding to the width of the air gap so as to extend substantially across the width thereof.

In operation, it is preferred to preheat the rotor. After the plates of the rotor and stator have reached a predetermined elevated temperature, the feed of the plastic material is initiated. The material flows freely from the hopper into the air gap through the feed opening. It is reduced to the plastic state by the combination of the heat from the plates and the blades 11 and 12 coupled with the heat generated by the shearing action imposed by said elements. After a rather short time in the hollow of the stator, the plastic sheared and degassed material is displaced inwardly in response to the action of the blades towards the central zone of the air gap from which it is extruded through the die opening.

The flow of the material towards the center, which is aided by the eccentric shape of the cavity 6 and by the action of the blades 11 and 12, has operated markedly to increase the output of the machine. Acceleration of the gelling or reduction to the plastic state in the central zone is obtained at the start of the operation and thereafter normal operating conditions are maintained.

The increase in centripetal force, which is contributed by the blades 11 and 12, is also manifest at the end of the extrusion operation when the feed has been stopped. The rotor is allowed to continue to turn for a short time at the end whereby the space between the rotor and stator is completly emptied of material. In the absence of such blades, the space would remain obstructed by a slab or biscuit of plastic material which continues to fill the hollow of the stator.

A comparative example will hereinafter be given in which use is made of an apparatus which does not embody the improvements of the invention, in part A, and in which use is made of the apparatus embodying the features of this invention, in part B, with uplasticized polyvinyl chloride as the plastic material.

Part A:

An extruding machine formed of disc plates which does not have an eccentric cavity in the stator and which is not equipped with the blades 11 and 12 is employed with unplasticized polyvinyl chloride powder having a bulk weight of 0.48 g./cc. and a viscosity index of 80. The diameter of the stator and of the rotor is 180 mm. and the die opening is 10 mm. in diameter and the rotor is operated at a turning speed of 120 r.p.m. The starting is difficult and had to be repeated several times. The output by extrusion was very irregular and difficult to express in numerical values. It was estimated at about 7 kg. per hour. The product, which was partially decomposed, was practically worthless. When the operation was terminated, the space between the rotor and stator was found to be filled with a biscuit of polyvinyl chloride which was black, indicating a high degree of decomposition.

Part B:

Extrusion apparatus embodying the features of this invention was used for the extrusion of unplasticized polyvinyl chloride from the same batch as the material used in part A. The operation started easily and the output became steady and regular from the very start. At steady operation, the output from the extruder was 22 kg./hour at 190° C. The product was free of gas and did not show any trace of decomposition. At the end, the rotor was continued in its turning movement for about one minute, during which the output fell slowly and the hollow of the stator was found to be completely emptied.

It will be apparent from the foregoing that I have provided a marked improvement in disc type extrusion machines for plastic materials. It will be understood that various modifications may be made in the machine and in its operation. For example, an additional feed channel or different feed channels, adapted for particular materials, may be incorporated into the apparatus. Changes may also be made in the number and shape as well as position of the blades 11 and 12. Instead of locating the die opening in the stator, it may be located in the rotor, and the like.

The apparatus described may be employed not only for extrusion but also for injection, filling and spinning or for the drawing of fibers with thermoplastic materials. It may be employed also for mixing, grinding, homogenizing and degassing plastic materials and the like.

It will be understood that changes may be made in the details of construction, arrangement and operation without departing from the spirit of the invention, especially as defined in the following claims.

I claim:

1. An apparatus for the extrusion of plastic material comprising a housing having a stator in the form of a stationary disc plate, a rotor in the form of a disc plate corresponding to the stator and arranged in face to face relationship therewith and mounted for rotational movement relative to the stator, and means for rotating the rotor, a cavity in the face of the stator facing the rotor with a rim about the cavity to define an air gap between the rotor and stator, a die opening in the stator through the central portion thereof for the extrusion of plastic material therethrough and a feed opening through a portion of the rim in communication with the air gap for feeding material to be processed into the air gap between the rotor and stator and a plurality of narrow deflector blades extending outwardly from the central portions of the adjacent faces of the stator and rotor into the air gap therebetween for engagement with the feed of plastic material for rapid reduction of the plastic material to the flowable state, homogenization of the plastic material and displacement to the die opening for extrusion.

2. An apparatus as claimed in claim 1 in which the cavity in the stator is of circular shape and arranged eccentrically with respect to the axis of the rotor.

3. An apparatus as claimed in claim 1 in which the one wall closer to the center of the cavity constitutes the leading edge of the feed opening to turn the material passing through the opening immediately upon entrance into the air gap.

4. An apparatus as claimed in claim 1 in which the blades on the stator are arranged in a circular path about the die opening.

5. An apparatus as claimed in claim 1 in which the blades on the stator are of curvilinear shape and angled with respect to the circular path about the axis.

6. An apparatus as claimed in claim 1 in which the blades on the stator extend outwardly from the base of the cavity a distance short of the face of the rotor.

7. An apparatus as claimed in claim 1 in which the blades on the rotor are arranged in a circular path about the center of the rotor.

8. An apparatus as claimed in claim 1 in which the blades are arranged in a circular path with the path of the blades of the stator separate from the path of the blades of the rotor.

9. An apparatus as claimed in claim 1 in which the blades are of curvilinear shape.

10. An apparatus as claimed in claim 1 in which the blades are angled with respect to the circular paths with the angle of the rotor blades opposite the angle of the stator blades.

11. An apparatus as claimed in claim 10 in which the blades are dimensioned to have a width corresponding to the width of the air gap.

References Cited

UNITED STATES PATENTS

| 3,000,618 | 9/1961 | Oakes. | |
| 3,046,603 | 7/1962 | Maxwell | 18—12 X |
| 3,253,300 | 5/1966 | Gove et al. | 18—12 X |
| 3,256,568 | 6/1966 | Stenger | 18—12 X |
| 3,277,528 | 10/1966 | Nififorov | 18—12 |
| 3,310,835 | 3/1967 | Morozov et al. | 18—12 |

WILLIAM J. STEPHENSON, *Primary Examiner.*